(12) United States Patent
Bigwood et al.

(10) Patent No.: US 9,940,219 B2
(45) Date of Patent: *Apr. 10, 2018

(54) DETECTING MERGE CONFLICTS AND COMPILATION ERRORS IN A COLLABORATIVE INTEGRATED DEVELOPMENT ENVIRONMENT

(71) Applicant: International Business Machines Corporation, Armonk, NY (US)

(72) Inventors: George T. Bigwood, Southfield, MI (US); Jason T. McMann, Plymouth, MI (US); Michael G. Nikitaides, Marietta, GA (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/239,984

(22) Filed: Aug. 18, 2016

(65) Prior Publication Data

US 2016/0357659 A1    Dec. 8, 2016

Related U.S. Application Data

(63) Continuation of application No. 14/829,826, filed on Aug. 19, 2015, now Pat. No. 9,454,459, which is a (Continued)

(51) Int. Cl.
*G06F 9/44*      (2006.01)
*G06F 11/36*     (2006.01)

(52) U.S. Cl.
CPC .......... *G06F 11/3624* (2013.01); *G06F 8/71* (2013.01); *G06F 11/36* (2013.01)

(58) Field of Classification Search
CPC .............. G06F 11/3466; G06F 11/36–11/3696
(Continued)

(56) References Cited

U.S. PATENT DOCUMENTS 6,192,515 B1    2/2001   Doshi et al.
7,290,251 B2    10/2007  Livshits
(Continued)

FOREIGN PATENT DOCUMENTS

JP    2012113373    6/2012
WO    2009138382    11/2009

OTHER PUBLICATIONS

Loeliger et al., Version Control with Git: Powerful Tools and Techniques for Collaborative Software Development, O'Reilly Media, 2012, 319 pages.
(Continued)

*Primary Examiner* — Francisco Aponte
(74) *Attorney, Agent, or Firm* — Schmeiser, Olsen & Watts, LLP; Michael Petrocelli

(57) ABSTRACT

A method, and associated computer system and computer program product, of detecting source code merge conflicts and compilation errors. Uncommitted changes associated with a source code are received periodically at each time of a sequence of times. A temporary branch corresponding to each uncommitted change is merged to corresponding portions of the source code. It is ascertained that no merge conflict resulted from the merging and in response, a compilation of a merged version of the source code is performed, wherein the merged version of the source code includes the temporary branch corresponding to each uncommitted change. It is determined that no compilation error occurred from the compilation and in response, a version of a product that includes the merged version of the source code is created.

20 Claims, 5 Drawing Sheets

Related U.S. Application Data continuation of application No. 14/053,911, filed on Oct. 15, 2013, now Pat. No. 9,158,658.

(58) Field of Classification Search
USPC .................................................. 717/126–127
See application file for complete search history.

(56) References Cited

U.S. PATENT DOCUMENTS

| | | | |
|---|---|---|---|
| 7,512,903 B2* | 3/2009 | Hudson, Jr. | G06F 3/0481 715/709 |
| 7,631,294 B2* | 12/2009 | Rush | G06F 8/33 717/111 |
| 7,844,949 B2 | 11/2010 | Clemm et al. | |
| 8,225,302 B2 | 7/2012 | Waugh et al. | |
| 8,448,140 B2 | 5/2013 | Isshiki et al. | |
| 8,453,138 B2 | 5/2013 | Meller et al. | |
| 8,539,463 B2 | 9/2013 | De et al. | |
| 8,752,015 B2 | 6/2014 | Basak et al. | |
| 8,826,222 B2 | 9/2014 | Bak et al. | |
| 8,918,429 B2 | 12/2014 | Stanev | |
| 9,086,885 B2 | 7/2015 | Canter et al. | |
| 9,158,658 B2 | 10/2015 | Bigwood et al. | |
| 9,454,459 B2* | 9/2016 | Bigwood | G06F 11/3624 |
| 2003/0115552 A1 | 6/2003 | Jahnke et al. | |
| 2003/0233585 A1* | 12/2003 | Quick | G06F 11/3604 726/1 |
| 2004/0044648 A1 | 3/2004 | Andfindsen et al. | |
| 2005/0261787 A1 | 11/2005 | Plante | |
| 2006/0015863 A1 | 1/2006 | Vaidyanathan et al. | |
| 2006/0123033 A1 | 6/2006 | Livshits | |
| 2006/0225040 A1 | 10/2006 | Waddington | |
| 2007/0220348 A1* | 9/2007 | Mendoza | G06F 11/3612 714/38.14 |
| 2007/0283321 A1 | 12/2007 | Hegde et al. | |
| 2011/0041120 A1 | 2/2011 | Nagappan et al. | |
| 2012/0005667 A1 | 1/2012 | DeLuca et al. | |
| 2012/0016839 A1 | 1/2012 | Yueh | |
| 2012/0167039 A1 | 6/2012 | Williams et al. | |
| 2012/0167040 A1 | 6/2012 | Davies et al. | |
| 2013/0036400 A1 | 2/2013 | Bak et al. | |
| 2014/0181789 A1 | 6/2014 | Canter et al. | |
| 2014/0344557 A1 | 11/2014 | Bartlow et al. | |
| 2015/0106790 A1 | 4/2015 | Bigwood et al. | |
| 2015/0355995 A1 | 12/2015 | Bigwood et al. | |

OTHER PUBLICATIONS

Goldman, Max, Software Development with Real-Time Collaborative Editing, PhD Dissertation, Massachusetts Institute of Technology, 2012, 133 pages.

Karasik et al., Merging by example, Retrieved from Internet Oct. 8, 2013, http://jaz.net/library/LearnItem.jsp?href=content/docs/source-control/mergingbyexample/index.html, 8 pages.

Mechanism to Inform Developers of Others Working on the Same File within an IDE, Nov. 26, 2012, IP.com, IP.com No. IPCOM000223717D, 2 pages.

Freed, Andrew, Comparing concepts between Subversion and Rational Team Concert, Retrieved from Internet Apr. 29, 2011, http://jazz.net/library/article/639/, 6 pages.

Dewan et al., Semi-Synchronous Conflict Detection and Resolution in Asynchronous Software Development, ECSCW'07, Proceedings of the Tenth European Conference on Computer Supported Cooperative Work, Sep. 24-28, 2007, Limerick, Ireland, Springer 2007, pp. 159-178.

Brun et al., Proactive Detection of Collaboration Conflicts, ESEC/FSE'11, Sep. 5-9, 2011, Szeged, Hungary, 2011, ACM 978-1-4503-0443-6/11/09, pp. 168-178.

Mario Luis Guimaraes, et al., Improving Early Detection of Software Merge Conflicts, Department of Computer Science and Engineering, INESC-ID, IST, Technical University of Lisbon, Lisbon, Portugal—ICSE '12 Proceedings of the 34th International Conference on Software Engineering, 2012, 11 pages.

Notice of Allowance (Jun. 10, 2015) for U.S. Appl. No. 14/053,911, filed Oct. 15, 2013.

Amendment (Mar. 13, 2015) for U.S. Appl. No. 14/053,911, filed Oct. 15, 2013.

Office Action (Dec. 17, 2014) for U.S. Appl. No. 14/053,911, filed Oct. 15, 2013.

Notice of Allowance (Jun. 9, 2016) for U.S. Appl. No. 14/829,826, filed Aug. 19, 2015.

Morgan Ekmefjord, Evaluation of the Perforce Source Code Management Tool used in Agile Software Development, Department of Information Technology, Dec. 2008, 53 pages.

* cited by examiner

DETECTING MERGE CONFLICTS AND COMPILATION ERRORS IN A COLLABORATIVE INTEGRATED DEVELOPMENT ENVIRONMENT

This application is a continuation application claiming priority to Ser. No. 14/829,826, filed Aug. 19, 2015, which is a continuation of Ser. No. 14/053,911, filed Oct. 15, 2013, U.S. Pat. No. 9,158,658, issued Oct. 13, 2015.

FIELD OF THE INVENTION

The present invention relates generally to a network based integrated development environment. More particularly, the present invention relates to a method, system, and computer program product for detecting merge conflicts and compilation errors associated with a source code.

BACKGROUND OF THE INVENTION

In a typical software development environment, integrated development environment (IDE) tools, such as Rational Application User, are used to modify source code during application development cycles. IDE may ran from a single user interface and permits the editing, compilation, and debugging of a computer program being developed from a common menu. Thus, an IDE allows a user to develop a computer program within a centralized environment. The IDE runs on a computerized system, including a computing device such as a personal computer, a laptop, a workstation, a mainframe, a mini-computer, or any other type of computing unit. Examples of IDEs include, but are not limited to, Eclipse®, ActiveState Komodo®, IntelliJ IDEA®, Oracle JUser®, NetBeans®, Microsoft Visual Studio®, Genuitec MyEclipse® and WinDev. Xcode® computer software programs. Computer program code for carrying out operations for the IDE may be written in any combination of one or more programming languages, including an object oriented programming language such as Java®, Smalltalk, C++ or the like and conventional procedural programming languages, such as the "C" programming language or similar programming languages.

Many source code projects are now often developed by more than one user. The users may work on a same project together in one physical location, but the users may work while dispersed geographically and/or temporally. When dispersed, users can utilize a communication network and network based IDE tools for collaboration. These types of tools may operate across a network in a distributed fashion on each user's computer, and allow the users to communicate with each other while building each user's changes on a software project. In this environment, a user may check out a working copy of the source code from the source code control repository in a network, may create projects in a workspace, imports source code, and may resolve ail dependent projects and libraries. This source code control repository may, for example, be a configuration management version control (CMVC) or a concurrent versioning system (CVS). After completing the changes, the users can commit their working copies to CMVC and CVS, typically in the implementation of a software project.

In this environment, the users can also create a separate version or a branch from a code base associated with the source code. As used herein, a main development stem of code base may be referred to as a trunk or a mainline. A fork of code base, perhaps corresponding to a previously released version, may be referred to as a branch. The branch may correspond to a previously released version of the code base. However, the users may also create a branch when they make long running changes to the code base, mainly because long-running changes are more likely to disrupt the development and build of the trunk. The users may also initiate a command to upload, also known as "commit command," their working copies consisting of code changes to a version control system, where the version control system periodically merges the branches to the mainline of the source code. By this approach, the version control system verifies whether the merge was successful, and if not, notifies the users that a merge conflict occurred.

SUMMARY OF THE INVENTION

The illustrative embodiments provide a method, system, and computer program product for detecting merge conflicts and compilation errors in a collaborative integrated development environment. Prior to at least one user uploading a set of uncommitted changes associated with a source code to a repository, the computer receives the set of uncommitted changes associated with the source code. The computer creates at least one temporary branch corresponding to the set of uncommitted changes associated with the source code. The computer device merges the at least one temporary branch to corresponding portions of the source code. The computer determines whether a merge conflict has occurred. If the merge conflict occurred, the computer communicates a first notification to the at least one user, the first notification indicating the merge conflict.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Overview

Figure 1:
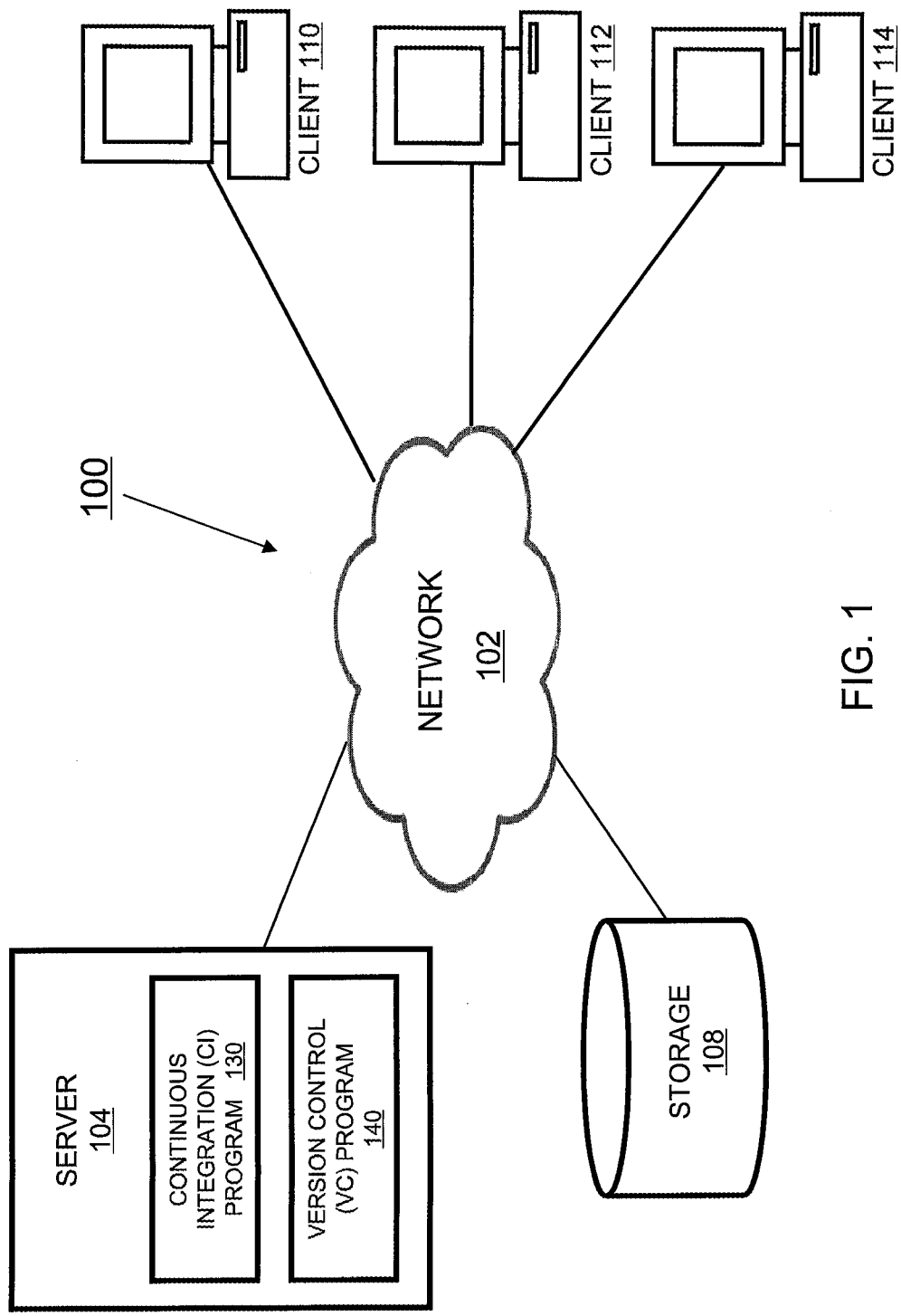
FIG. 1 depicts a pictorial representation of a network of data processing systems in which illustrative embodiments may be implemented.

When users on source code projects utilize the pre-existing version control systems and continuous integration servers, users are required to commit their changes to the source code before uploading them over a network. Thus, when merge conflicts occur, the users are left with little option but to undo the committed changes and repeat the process all over again. An example of such problem is presented hereinbelow. A first user is working on a bug fix for a version of the product that was previously released. Meanwhile, in the current version of the code, a second user, without being aware of the first user's efforts, is making changes to the same files that the first user is working on. The first user fixes the code and commits his work into the code repository under the previous version branch of code.

To ascertain that the bug is also fixed in the current version of the product, the first user decides to merge his changes in the previous version's branch into the current version's trunk. He expects the merge to go smoothly using the automated merging tool. As he runs the merge tool, the first user is prompted with hundreds of conflicts and quickly realizes that the simple merge was not going to happen because the second user changed the current version. To make matters worse, the second user is unable to be reached. As a result, the first user spends the countless hours unraveling all of the code changes that the second user made and figuring out how to integrate his bug fixes into the new code.

As shown by the example above, manually updating and attempting merges after committing changes to the source code are time-consuming and difficult. Further, after committing the changes, having continuous build system notify compilation errors does not address the above problem adequately when two or more users are concurrently creating conflicting changes to same or different versions of the source code.

Accordingly, illustrative embodiments provide an environment where a user's uncommitted changes (i.e. changes that have not yet uploaded from a user workstation to a repository or workspace) are periodically uploaded to the version control system that allows the uncommitted changes to be merged against all of the other branches, which includes other users' uncommitted changes. Thereafter, the continuous integrated system receives the code base with uncommitted changes and attempts to perform a build operation, including converting the source code in an executable code. When merge conflicts or compilation errors occur within the environment, the illustrative embodiments notify the user of potential merge conflicts due to the other users' current efforts as all users are simultaneously or asynchronously working and before all the users are yet to commit their changes to a repository or workspace. The notifying function can generally be implemented by displaying markers or other types of notifications in the IDE. The illustrative embodiments thus prevent potential merge conflicts before any changes are committed and may further prevent users from inadvertently duplicating their efforts.

Further, the illustrative embodiments can prevent potential merge conflicts without an auto-resolve function. For instance, if a function name has been changed by one user, and the arguments to that function have been changed by another user, auto-resolve function probably fails. Likewise, if one user adds functionality to existing methods of a class, while another user re-factors the methods of that class, manually merging can be tedious and time-consuming. By notifying users of potential merge conflicts with other users' current efforts as they are working and before they even think about committing their changes to a repository or workspace, the illustrative embodiments not only prevent merge conflicts in the future, but may also prevent users from inadvertently duplicating or wasting effort, as they sooner become aware of each other's conflicting changes.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

System for Detecting Merge Conflicts and Compliation Errors

Figure 2:
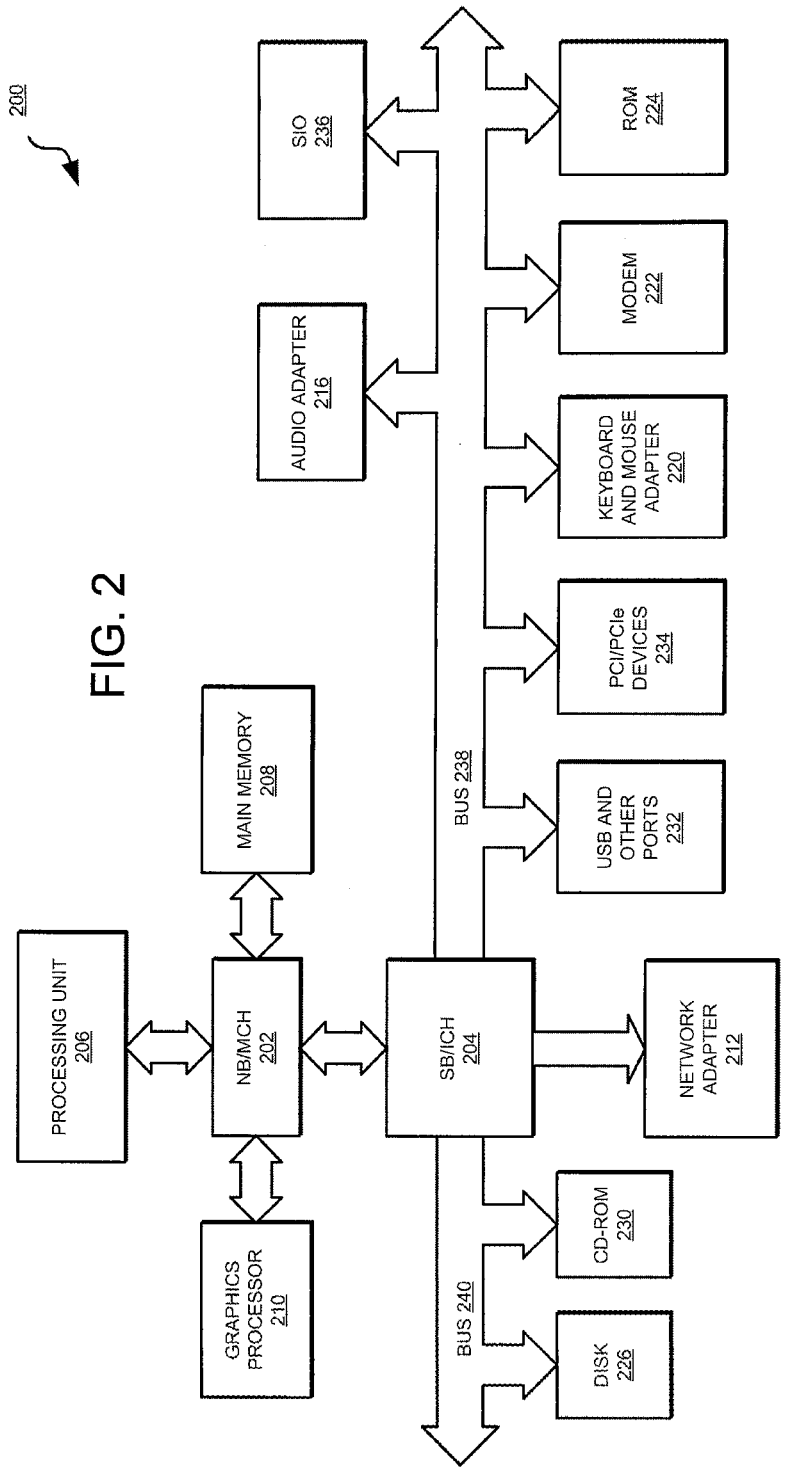
FIG. 2 depicts a block diagram of a data processing system in which illustrative embodiments may be implemented.

With reference to the FIGS. and in particular with reference to FIGS. 1 and 2, these FIGS. are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 couples to network 102 along with storage unit 108. Software applications may execute on any computer in data processing environment 100.

In addition, clients 110, 112, and 114 couple to network 102. A data processing system, such as server 104, or client 110, 112, or 114, may contain data and may have software applications or software tools executing thereon.

Only as an example, and without implying any limitation to such architecture. FIG. 1 depicts certain components that are usable in an example implementation of an embodiment. For example, server 104 may include continuous integration program 130 and version control program 140. Server 104 may include internal and external hardware components, as depicted and described in further detail with respect to FIG. 2.

Server 104, storage unit 108, and clients 110, 112, and 114 may couple to network 102 using wired connections, wireless communication protocols, or other suitable data connectivity. Clients 110, 112, and 114 may be, for example, a personal computer, a laptop, a workstation, a mainframe, a mini-computer, or any other type of computing unit.

In the depicted example, server 104 may provide data, such as boot files, operating system images, files related to the operating system and other software applications, and applications to clients 110, 112, and 114. Clients 110, 112, and 114 may be clients to server 104 in this example. Clients 110, 112, 114, or some combination thereof, may include their own data, boot files, operating system images, files related to the operating system and other software applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110, 112, or 114 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238, Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. A computer readable or usable storage device does not include propagation media. Hard disk drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2, The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java® programming system, may run in conjunction with the operating system and provides calls to the operating system from Java® programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as continuous integration program 130 and version control program 140 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter, A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
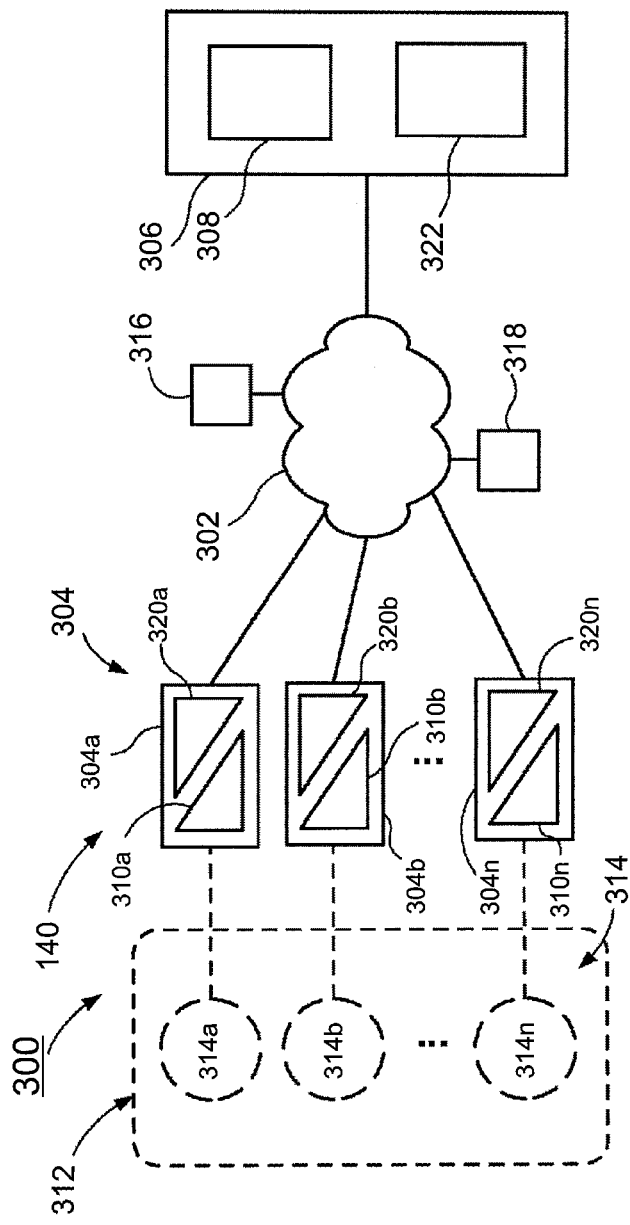
FIG. 3 depicts a block diagram of example configuration for version control systems in accordance with an illustrative embodiment.

With reference also to FIG. 3, a development environment, indicated generally at 300, is an example of data processing environment 100 in which illustrative embodiments may be implemented. Development environment 300 offers features and capabilities for producing a product, such as a computer program, website, or publication. Development environment may include communications network 302, which may be an example of network 102; one or more developer's workstations 304a-304n, which may be examples of a client 110, 112, 114; and at least one server 306, which may be an example of a server 104 and which may host or have access to storage 308. Each workstation 304a-304n may run or have access to Integrated Development Environment (IDE) programs 310a-310n selected for the task at hand. As used herein, IDE programs 310a-310n are sets of computer programs that are run from a single user interface, and that permit the editing, compilation, and debugging of a computer program being developed from a common menu. For example, to develop products delivered as object files, IDE programs 310a-310n may include one or more text editors, compilers, assemblers, interpreters, and/or debuggers; to develop websites, IDE programs 310a-310n may include HTML, CSS, graphics, and/or script editors and validators; or to develop internal or published documentation, tools may include word processors, graphics editors, and/or page-layout software. Other development tasks, other tools, and other combinations of tools will be apparent to those skilled in the art.

Development projects may be collaborative efforts involving a plurality of developers 314, hereinafter called a team 312, that includes at least one developer 314a operating at least one workstation 304a and one or more other developers 314b-314n of a plurality of developers 314, each of the other developers 314b-314n operating one or more other workstations 304, such as workstations 304b-304n. Members of team 312 may be in close proximity or widely distributed and may be considered a team by the fact that they are developing the same source code. Members of team 312 may have access to email 316, discussion forums 318, and other sources of project-related information, for example via network 302.

Development environment 300 may further include a version control program 140. Version control program 140 may include client-side components 320a-320n that run on workstations 304a-304n and server-side components 322 that run on servers 306. These components may communicate when appropriate via communications network 302. It is understood that FIG. 3 is intended as an illustrative example, and not as an architectural limitation. Development environment 300 may include other workstations, servers, and devices not shown; or it may include fewer devices than those shown.

Figure 4:
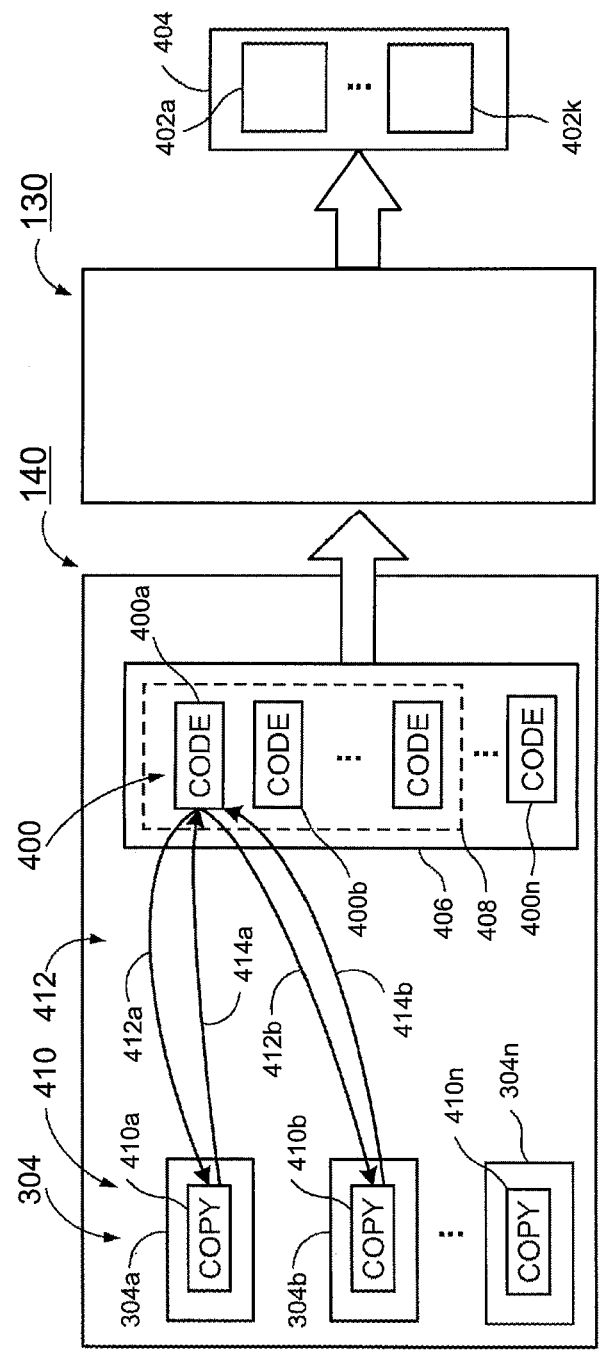
FIG. 4 depicts a block diagram of example configuration for version control systems coupled to a continuous integration system in accordance with an illustrative embodiment.

Referring now also to FIG. 4, version control program 140 is an example of a portion of development environment 300 in which illustrative embodiments may be implemented. Version control program 140 may provide features for tracking, managing, and/or implementing changes to source-code files 400 and for generating (or building) one or more versions 402a-402k of a product 404. Each version 402a-402k of product 404 may be an update to a previous product release (e.g., to correct errors) or an upgrade offered as a new product release (e.g., to add new features). Version control program 140 provides the ability to assign a unique identifier, which may be called a version number, to designate a variant of product 404, for example, to define a distinguishable revision or configuration of product 404. It is understood that the "a-n" and similar notation used herein to indicate an indefinite range does not necessarily imply any direct correspondence between items designated by the same letter; or that each range has the same number of items; or that the designated items are in any ordinal sequence. For example, version 402a does not necessarily correspond to developer 314a, who might or might not be among the developers working on version 402a; and the total number of developers may differ from the total number of versions.

Source-code repository 406 may be a storehouse for source code, which may be stored in one or more source-code files 400a-400n, also referred to a source code. Files 400a-400n may contain program instructions, ASCII text, binary data, image data, formatted documents, or any other type of information. With reference to FIG. 3, repository 406 may be implemented via a server 306 in communication with storage 308 for example via network. Other functional combinations will be apparent to those skilled in the art.

To provide the ability to build or rebuild one or more versions 402a-402k of product 404, version control program 140 may maintain a code base 408, which may be a set of source-code files 400a-400n in source-code repository 406 managed by version control program 140 to build product 404. Repository 406 may store more than one code base 408, and a source file 400 in repository 406 may belong to more than one code base 408. Version control program 140 may maintain a record of changes to the content of each source file 400 in repository 406, where the changes to content may be stored as differences or deltas between versions. Source code 400a-400n in a code base 408 managed by version control program 140 may be referred to as revision-controlled base source code.

Version control program 140 may maintain one or more log files that list and describe each change to the base source code. A log file may detail each change by file name and line number, for example, the log file thereby being an example of a source of information indicative of changes being made to the base source code by the team or plurality of developers. For example, if a developer 314 checks in a revised version of a source-code file 400 that contains an inserted line of code, then version control program 140 may write data to one or more log files, such as a commit log file, to document the insertion.

A main development stem of code base 408, perhaps dedicated to a future upgrade release of product 404, may be referred to as a trunk or a mainline. A fork of code base 408, perhaps corresponding to a previously released version, may be referred to as a branch. Version control program 140 may provide the ability to apply specified changes to specified numbered versions. For example, changes that add new functionality may be limited to the trunk, while changes that correct errors may propagate to one or more specified branches to support an eventual updated revision. In one embodiment, working copy 410 can be created as a branch of a mainline. For example, developer 314a can be working on working copy 410a in a first branch, while developer 314b can be working on working copy 410b in a second branch.

Features of version control program 140 may allow a developer 314 to designate a version number and check out a working copy 410 of all or part of code base 408, thereby obtaining a private copy of all or part of the designated revision-controlled base source code synchronized to that version number. During a check-out operation, indicated at 412*a* and 412*b*, version control program 140 may create a working copy 410*a* or 410*b* of each file 400 that has been checked out and provide access by respective developer 314 to copy 410. Working copy 410 may reside on workstation 304 used by developer 314 but may reside elsewhere, for example, on a server maintained for version control program 140 and in communication with workstation 304. Access to working copy 410 provides developer 314 with the ability to make changes to his or her working copy 410. A developer may build a private variation of all or part of changed product 404, for example, to implement changes to the product.

In one embodiment, version control program 140 may allow the developer to check one or more changed files in a working copy back into repository 406, for example, to apply changes made to a portion of the source code into one or more numbered versions of product 404. In one embodiment, version control program 140 is configured to automatically receive, via receiving operations 414*a* and 414*b*, one or more changes to working copy 410 without a manual check-in operation from developer 314. Receiving operations 414*a* and 414*b* publishes changes from a working copy into the base source code 408, also called the code base, which is the official or canonical version of the code under development by the team. Upon receipt of the changes, version control program 140 may perform a merge operation to apply changes from the working copy into one or more specified trunks or branches. For example, by means of a file-comparison operation that yields a list of differences between the working copy and the base source code, the differences may be stored as a record of the change. When the merge operation is successful, version control program 140 provides the updated code base 408 to continuous integration program 130, which incorporate all changes accumulated in the specified branch and generates or builds a specifi ed version of product 404.

For example, if a bug has been reported in a version of product 404, developer 314 may use version control program 140 to check out the relevant portion of the base source code 408 synchronized to that version, fix the bug. When developer 314 is fixing the bug, version control program 140 automatically receives the changes being made to working copy 410 and merges these changes, so that continuous integration program 130 can periodically rebuild a revision of the version that includes the correction. If the bug exists in other versions, features of version control program 140 may enable specifying other numbered versions to benefit from the same change.

Thus, continuous integration program 130 provides capabilities for continuous building or rebuilding any designated version of product 404. For example, to build a specifi ed version of product 404, version control program 140 may perform any existing merge operations, and, upon a successful merge, may generate from code base 408 a set of source-code files synchronized to the specified version. Continuous integration program 130 receives the set of source-code files synchronized to the specified version from version control program 140 and directly or indirectly compiles or otherwise assembles one or more executable programs for inclusion in the specified version. By storing a code base 408, version-specific records of changes to the content of source code, and log files documenting the changes, and by providing merged files to continuous integration program 130 that builds any designated version of product 404, version control program 140 provides capabilities that enable a developer or a team of developers to work concurrently on multiple versions of product 404.

If development environment 300 has a client-server architecture, portions of version control program 140 may run or reside on one or more servers, and portions may run or reside on one or more client workstations 314. Those skilled in the art will understand that networked environments can express similar functionality thorough diverse architectural designs.

During a merge operation, version control program 140 may generate one or more log files that document the merge operation, the build operation, or both. For example, when while making changes to working copy 410, developer 314 may write comments describing the change, and version control program 140 may save data such as a developer ID, comments, a time stamp, and/or other details in the form of a log file, which may accumulate entries spanning a series of changes. In another example, version control program 140 may save computer-generated data such as a list of differences between revisions to a log file, such as a patch log file. Log files may serve as references or information sources for locating or understanding particular changes.

When only one developer at a time changes a given file 400, version control program 140 may automatically receive the changes to working copy 410 without manual intervention (e.g. check-in operation) from developer 314 to conduct a straightforward merge operation to detect differences between the changes to working copy 410 and the base source code 408 and propagate those differences into one or more designated branches. In one embodiment, version control program 140 may offer developer 314 an option during a check-out operation 412 to lock one or more files being checked out. In this embodiment, version control program 140 places a locked file under the exclusive control of the developer who locked it. Further, version control system 140 may stop receiving any changes associated with the source code file from other developers when the source code file is locked.

In one embodiment, developers may disregard locks held by other developers and to edit independent working copies of source files. For example, a first developer 314*a* may check out, lock at 412*a*, and edit working copy 410*a* of source file 400*a*. Second developer 314*b* may check out at 412*b* the source file 400*a*, accidentally or intentionally disregard the lock, and edit at 414*b* an independent working copy 410*b* of source file 400*a*. In this situation, locked working copy 410*a* and the independent working copy 410*b* may differ from source file 400*a*. In this case, version control program 140 may receive both working copies 410*a* and 410*b* and may accommodate the differences between locked copy 410*a* and independent copy 410*b*. For working copy 410*a*, version control program 140 performs merge operation to check for conflicts to source file 400*a*, finds no conflicts, and performs a straightforward update to the base source code file 400*a* in repository 406.

For working copy 410*b*, version control program 140 performs merge operation to consider the set of committed changes relative both to the original base source file 400*a* and to the changes applied by the first merge operation. If two sets of changes are in functionally distinct regions of the same file 400*a*, merge operation may be able to resolve the conflict automatically. If two sets of changes are in the same or functionally related regions, version control program 140 may either notify the developers of a possible merge conflict and/or block the changes to working copy 410b to the locked source file 400a.

Process for Detecting Merge Conflicts and Compilation Errors

Figure 5:
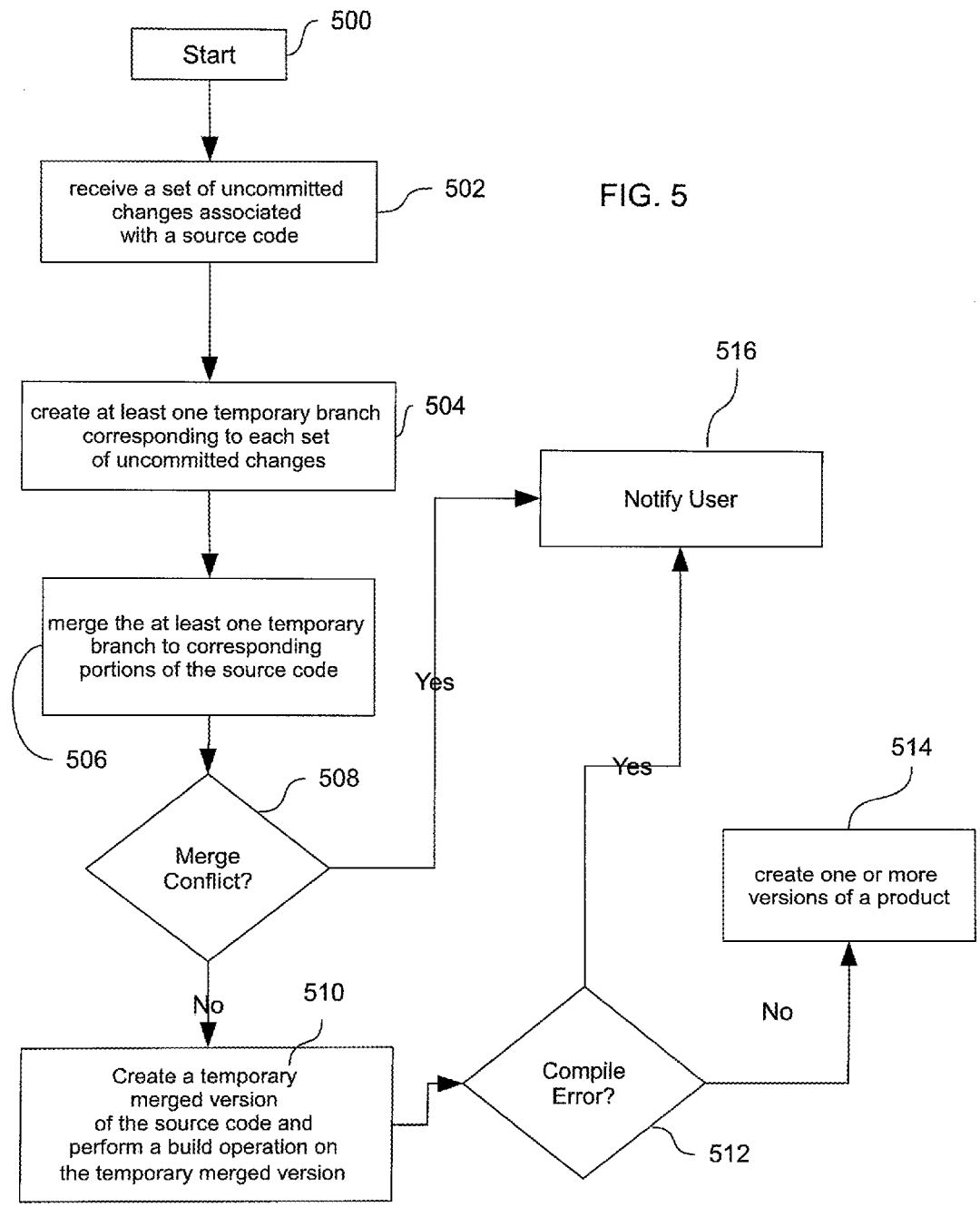
FIG. 5 depicts a flowchart of an example process detecting merge conflicts and compilation errors in a collaborative integrated development environment in accordance with an illustrative embodiment.

FIG. 5 is a flow diagram of a detecting source code merge conflicts, where the process is implemented in the system of FIG. 2, in accordance with embodiments of the present invention. The process of FIG. 5 begins at step 500. In step 502, version control program 140 receives a set of uncommitted changes associated with a source code. In another embodiment, version control program 140 may receive a set of uncommitted changes and a set of committed changes from developers 314a-314n. In one embodiment, version control program 140 may receive the set of uncommitted changes associated with a source code in predetermined time intervals. For example, version control program 140 may receive the set of uncommitted changes every 90 minutes or 3 hours, but not limited hereto. In one embodiment, version control program 140 may receive the set of uncommitted changes on a pre-determined time, e.g. 11:59 PM. In one embodiment, version control program 140 receives the set of uncommitted changes in response to changes that developer 314 applies on working copy 410. For example, version control program 140 may receive the uncommitted changes for every n lines added to working copy 410, where the n lines threshold is predetermined by the user. In another embodiment, version control program 140 may receive the set of uncommitted changes upon passing of a local merge and build test by workstation 304 on the set of uncommitted changes to working copy 410. In one embodiment, version control program 140 may receive a set of uncommitted changes from directly from IDE program 310a-310n stored in clients 110, 112, and 114. Alternatively, version control program 140 may receive the uncommitted changes from repository 406, which in turn may receive the uncommitted changes from IDE program 310a-310n stored in clients 110, 112, and 114. In one embodiment, the set of uncommitted changes can be designated as temporary changes in version control program 140, where other portions including the set of committed changes may already exist within version control program 140. As used herein, uncommitted changes are tentative changes that have not been uploaded by the user to a repository or workspace and are often unfinished works in progress, and committed changes are changes that are submitted into the repository, e.g. repository 406, and they are often indicated as permanent changes.

In step 504, version control program 140 creates at least one temporary branch corresponding to each set of uncommitted changes. For example, version control program 140 receives uncommitted changes to working copy 410a by developer 314a and creates a first temporary branch, and further receives uncommitted changes to working copy 410b by developer 314b and creates a second temporary branch. In one embodiment, version control program 140 may also identify whether the set of committed changes is made to at least one branch associated with the source code. In another embodiment, version control program 140 does not create the temporary branch, but rather, identifies whether the set of uncommitted changes is made to the at least one branch associated with the source code. For example, version control program 140 may determine whether the set of committed or uncommitted changes that are being made on a branch by identifying a user command, e.g. svn copy, that issued when version control program 140 initiated the creation of the branch from the mainline. In the event that the temporary branches are not created and the set of uncommitted changes is not made to any branch associated with the source code, version control program 140 may by pass the merge operation and provide the set of uncommitted changes to continuous integration program 130 for build operation, as shown in step 510 hereinbelow.

In step 506, version control program 140 merges the at least one temporary branch to corresponding portions of the source code. Corresponding portions of the source code include mainline of the source code or other branches created from the mainline of the source code. In another embodiment, version control program 140 merges both the temporary branches and the set of committed changes to the corresponding portions of the source code. The types of merge operations include, but not limited to, a three-way merge, a recursive three-way merge, a fuzzy patch application, a weave merge, and patch commutation, etc.

In step 508, version control program 140 determines whether at least one merge conflict has occurred. A merge conflict includes at least two different changes are made by at least two developers on the same portion of the source code. For example, merge conflict may occur when developer 314a retrieves working copy 410a from source file 400a and removes the last three empty lines from source file 400a, while developer 314b retrieves another working copy 410b from the same source file 400a and appends additional functions after the last three empty lines of source file 400a. In another example, merge conflict may occur when developer 314a retrieves working copy 410a from source file 400a and adds a condition to function provided line m (where m is an integer value) in source file 400a, while developer 314b retrieves another working copy 410b from the same source file 400a and changes the function provided line m (where m is an integer value) in source file 400a. The above examples are used only for the clarity of the description and are not limiting to the illustrative embodiments. Additional data, operations, actions, tasks, activities, and manipulations will be conceivable from this disclosure and the same are contemplated within the scope of the illustrative embodiments. If a merge conflict occurred, version control program 140 notifies the user in step 516, the step being described in detail hereinbelow.

If version control program 140 does not detect any merge conflicts in step 508, version control program 140 creates a temporary merged version of the source code and provides the temporary merged version to continuous integration program 130. In step 510, continuous integration program 130 performs a build operation on the temporary merged version associated with the source code. As used herein, a build operation is the sequence that includes compiling and linking source code, with possibly other tasks such as installer creation. More specifically, continuous integration program 130 compiles the temporary merged version of the source code to an object code, and may link the object code with libraries to form an executable code. Continuous integration program 130 can be further configured to ran in a similar or compatible application binary interface, or a standalone software artifact, such as product 404.

In step 512, continuous integration program 130 determines whether a compilation error was caused by step 510. Compilation error is an error when a compiler fails to compile the source code into an object code. Some compilation errors include, but are not limited to, undeclared identifier, undeclared common function, parse error, compiler errors, etc. In one embodiment, continuous integration program 130 may determine whether a compilation error occurred on the temporary merged version of the source code by running two tests. The first test stubs at least one database in the temporary merged version prior to performing compilation and ran tests. Stubbing refers to turning a database within the source code into a smaller item, or by deleting the attachments and modifying the source code to be smaller. The second test, which may run concurrently or after the first test, performs compilation and run tests on the source code without stubbing the specified database.

In step 514, continuous integration program 130 creates one or more versions of a product if no compilation error is identified. In one embodiment, the one or more versions of product include one or more versions 402a-402k of a product 404, where the one or more versions of the product can be prepared for software deployment. In another embodiment, continuous integration program 130 may communicate to the user whether one or more versions 402a-402k of product 404 should be created.

In step 516, continuous integration program 130 communicates a notification to the one or more users, the notification including an error message indicating a type of error that has occurred. In one embodiment, continuous integration program 130 communicates the error message by displaying a marker in margins (e.g. gutter) of a source code editor in IDE programs 310a-310n, where the margins may display each line number of the source code. In one embodiment, the marker may indicate: identity of the at least one user who created the set of uncommitted changes; the time when the set of uncommitted changes was made, and the version of the source code that includes the set of uncommitted changes. In one embodiment, continuous integration program 130 may receive log files from version control program 140 and incorporation the data included the log files to the marker. As provided above, the log files generated by version control program 140 may include a developer ID, comments, a time stamp, and/or other details. In one embodiment, the marker can be placed in proximity of the lines or blocks where uncommitted changes were made. In another embodiment, continuous integration program 130 can highlight the lines or blocks where the set of uncommitted changes were made.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for detecting merge conflicts and compilation errors in a collaborative integrated development environment. An embodiment prevents potential merge conflicts caused by simultaneous, asynchronous changes to the source code before all users are yet to commit their changes to a repository or workspace. If no merge conflicts occur, an embodiment can further validate the uncommitted change by creating a temporary merge version and performing a build operation on the temporary merged version to determine whether a compilation error occurs. An embodiment can significantly reduce duplicate user efforts by a real-time display of the marker whenever an uncommitted change is made to the source code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage device(s) having computer readable program code/instructions embodied thereon.

A computer readable storage device may be any tangible device that can retain or store program code for use by an instruction execution system, apparatus, or device. A computer readable storage device may be, for example, but not limited to, an electronic storage device, magnetic storage device, optical storage device, electromagnetic storage device, infrared storage device, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), static random access memory (SRAM), a portable compact disc read-only memory (CD-ROM), digital versatile disk (DVD), memory stick, floppy disk, an optical storage device, a magnetic storage device, or any suitable combination of the foregoing. The computer-readable storage device does not include a signal propagation media such as a copper transmission cable, an optical transmission fiber, or a wireless transmission media.

Program code can be downloaded to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers, A network adapter card or network interface card in each computing/processing device receives a program from the network and forwards the program for storage in a computer-readable storage device within the respective computing/processing device.

Computer program code for carrying out operations for aspects of the present invention may be assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart, illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

What is claimed is:

1. A method of detecting source code merge conflicts and compilation errors, the method comprising:
    receiving, periodically at each time of a sequence of times by one or more processors of a computer system, a plurality of uncommitted changes associated with a source code;
    merging, by the one or more processors, a temporary branch corresponding to each uncommitted change to corresponding portions of the source code;
    ascertaining, by the one or more processors, that no merge conflict resulted from said merging and in response, performing a compilation, by the one or more processors, of a merged version of the source code, said merged version of the source code comprising the temporary branch corresponding to each uncommitted change; and
    determining, by the one or more processors, that no compilation error occurred from the compilation and in response, creating, by the one or more processors, a version of a product that includes the merged version of the source code.

2. The method of claim 1, said method further comprising: verifying, by the one or more processors, that each uncommitted change pertains to the corresponding temporary branch by identifying a user command that issued when said creating the corresponding temporary branch was initiated.

3. The method of claim 1, wherein said receiving the plurality of uncommitted changes is in response to a determination that the plurality of uncommitted changes on a working copy of the source code passed a local merge and build test.

4. The method of claim 1, wherein said receiving the plurality of uncommitted changes is in response to a determination of occurrence of a predetermined time.

5. The method of claim 1, wherein said receiving the plurality of uncommitted changes is in response to a determination that a predetermined number of lines of code has been added to a working copy of the source code.

6. The method of claim 1, wherein the sequence of times occur in accordance with a predetermined constant time interval between the times in the sequence.

7. The method of claim 6, wherein the constant time interval is ninety minutes or three hours.

8. A computer program product, comprising a computer readable storage device having computer readable program code stored therein, said program code containing instructions configured to be executed by one or more processors of a computer system to implement a method of detecting source code merge conflicts and compilation errors, said method comprising:
    receiving, periodically at each time of a sequence of times by the one or more processors, a plurality of uncommitted changes associated with a source code;
    merging, by the one or more processors, a temporary branch corresponding to each uncommitted change to corresponding portions of the source code;
    ascertaining, by the one or more processors, that no merge conflict resulted from said merging and in response, performing a compilation, by the one or more processors, of a merged version of the source code, said merged version of the source code comprising the temporary branch corresponding to each uncommitted change; and
    determining, by the one or more processors, that no compilation error occurred from the compilation and in response, creating, by the one or more processors, a version of a product that includes the merged version of the source code.

9. The computer program product of claim 8, said method further comprising: verifying, by the one or more processors, that each uncommitted change pertains to the corresponding temporary branch by identifying a user command that issued when said creating the corresponding temporary branch was initiated.

10. The computer program product of claim 8, wherein said receiving the plurality of uncommitted changes is in response to a determination that the plurality of uncommitted changes on a working copy of the source code passed a local merge and build test.

11. The computer program product of claim 8, wherein said receiving the plurality of uncommitted changes is in response to a determination of occurrence of a predetermined time.

12. The computer program product of claim 8, wherein said receiving the plurality of uncommitted changes is in response to a determination that a predetermined number of lines of code has been added to a working copy of the source code.

13. The computer program product of claim 8, wherein the sequence of times occur in accordance with a predetermined constant time interval between the times in the sequence.

14. The computer program product of claim 13, wherein the constant time interval is ninety minutes or three hours.

15. A computer system comprising: one or more processors, one or more computer readable storage devices, one or more memories, said one or more storage devices containing program code which, upon being executed by the one or more processors via the one or more memories, implements a method of detecting source code merge conflicts and compilation errors, said method comprising:
- receiving, periodically at each time of a sequence of times by the one or more processors, a plurality of uncommitted changes associated with a source code;
- merging, by the one or more processors, a temporary branch corresponding to each uncommitted change to corresponding portions of the source code;
- ascertaining, by the one or more processors, that no merge conflict resulted from said merging and in response, performing a compilation, by the one or more processors, of a merged version of the source code, said merged version of the source code comprising the temporary branch corresponding to each uncommitted change; and
- determining, by the one or more processors, that no compilation error occurred from the compilation and in response, creating, by the one or more processors, a version of a product that includes the merged version of the source code.

16. The computer system of claim 15, said method further comprising: verifying, by the one or more processors, that each uncommitted change pertains to the corresponding temporary branch by identifying a user command that issued when said creating the corresponding temporary branch was initiated.

17. The computer system of claim 15, wherein said receiving the plurality of uncommitted changes is in response to a determination that the plurality of uncommitted changes on a working copy of the source code passed a local merge and build test.

18. The computer system of claim 15, wherein said receiving the plurality of uncommitted changes is in response to a determination of occurrence of a predetermined time.

19. The computer system of claim 15, wherein said receiving the plurality of uncommitted changes is in response to a determination that a predetermined number of lines of code has been added to a working copy of the source code.

20. The computer system of claim 15, wherein the sequence of times occur in accordance with a predetermined constant time interval between the times in the sequence.

\* \* \* \* \*